United States Patent Office.

ALFRED PARAF OF NEW YORK, N. Y., ASSIGNOR TO EDWARD S. RENWICK, TRUSTEE.

Letters Patent No. 95,040, dated September 21, 1869; reissue No. 4,363, dated May 2, 1871.

IMPROVEMENT IN PROCESSES OF OBTAINING BRIGHT COLORS UPON CLOTH BY PRINTING.

The Schedule referred to in these Letters Patent and making part of the same.

*To all whom it may concern:*

Be it known that I, ALFRED PARAF, of France, at present a resident in the city, county, and State of New York, have made an invention or discovery of a new and useful Process of Obtaining Bright Colors upon Cloth by Printing; and that the following is a full, clear, and exact description and specification of my said invention.

My invention consists of the process of printing colors upon cloth or other textile fabric by the following operations, viz.:

First, the application of the coloring matter to the cloth by printing it thereon.

Second, the application to the cloth of a chemical compound of an alkali and a volatile acid, which will partially decompose, (but not wholly,) by steaming the cloth subsequent to the printing of the color, and thus leave the alkali in such a condition that it acts upon and brightens or develops the primitive color or transforms it into the desired color.

Third, the steaming of the printed cloth.

The order in which the first two operations are performed is not material to the invention, although I prefer to apply the color and the partially-decomposable combination of the acid and alkali simultaneously to the cloth, by mixing them together, and printing them simultaneously, whenever the nature of the color permits this mode of application.

The partially-decomposable combinations of acid and alkali, which I have used with success, are the following, viz.:

Acetate of potash; acetate of soda.

Each of these contains an alkali that will act upon the color, and each has that alkali combined with a volatile acid which partially passes off or is partially dissipated in the operation of steaming, leaving a sub-compound of the acid and alkali in such a condition that the alkali acts upon and brightens the color.

In order that my invention may be fully understood, I will proceed to describe the mode in which I have practiced it with success when printing madder colors upon cotton cloth.

The preparation of madder which I prefer to use for this purpose is the extract of it called tinctorine, and described in the patent granted to me the 17th day of August, A. D. 1869. For printing red madder-color I prefer a compound made as follows, viz.:

Tinctorine, forty pounds; rancid olive-oil, ten pounds; liquid acetic acid at 10° Twaddle, one hundred pounds; starch, in powder, twenty-two pounds.

I boil the mixture so as to dissolve the starch; I then permit it to cool, and add—

Solution of acetate of alumina at 16° Twaddle, fifteen pounds; solution of acetate of soda at 16° Twaddle, ten pounds.

For printing purple madder-color, I prepare a compound made as above, using the same ingredients, with the exception of the acetate of alumina. I replace that ingredient by an equal quantity of the solution of acetate of iron at 10° Twaddle.

For printing chocolate madder-colors I mix together equal quantities of the above two compounds.

I print the compound upon the cloth in the same manner and by the same means as are commonly used for printing cotton cloth with other compounds. Then I hang up the printed article in the air for at least two hours, the effect of which appears to be to start the volatilization of the acetic acid. I then place the article in a steam-chest, such as is commonly employed in print-works for the purpose of steaming printed cloths, and I steam it with steam of two and a half pounds' pressure for half an hour. I afterward hang up the article so as to expose it to the contact of air for two hours, and then wash it, If I find washing necessary.

The theory of my process appears to be as follows: the volatile acid prevents the alumina or the iron (as well as the alkali) from combining with the coloring matter until the printing is effected. The steaming dissipates the acetic acid, permitting the alumina or the iron to form a colored compound with the coloring matter, and leaving a sub-acetic of the alkali to develop, transform, or brighten the color produced. The employment of the oil, or some equivalent, is advantageous, because it combines with any excess of alkali to form a soap, thereby preventing such excess from injuring the color.

The mode of application above described may be varied. Thus, for example, the cloth may first be padded (in the common mode practiced by calico-printers) with the acetate of soda or of potash, after which it should be hung up in an aging-room (where the atmosphere is warm and moist) until the acetic acid has partially passed off, leaving a sub-acetate of the alkali, which is not decomposable by aging or steaming. The cloth may then be printed with a compound of the coloring matter, from which the partially-decomposable acetate of the alkali is omitted, after which the cloth should be treated as when it is printed simultaneously with the color and with the partially-decomposable acetate of the alkali.

Again, an acetate of soda, or of potash, or a mixture of these, may be compounded with the coloring matter before the latter is compounded with the starch and acetic acid. In this case the starch should be boiled with the acetic acid, and the solution should be permitted to cool, after which the compound of the color and partially-decomposable acetate of the alkali may be stirred into it, and also the acetate of alumina or of iron, according to the color required.

The process thus described is not restricted to madder-colors, but may be used with advantage in printing other coloring materials the colors of which are developed or brightened by the action of an alkali, among which may be enumerated the following, viz.:

Quercitron bark, sandal-wood, log-wood, Brazil-wood, alkanet, anatto, chromate of lead, rhubarb-root, Persian berry, chrome-green.

Moreover, the ingredients used in making the compounds that are applied to the cloth, and the proportions in which the ingredients are compounded, may be varied, as found expedient, so long as the process be not materially changed.

I am now aware that the acetate of lime has been used in dyeing madder-colors previous to my invention; but my invention differs from the process practiced with the acetates of lime in the respect that the acetates of soda and potash are but partially decomposed by aging and steaming, being transformed into sub-acetates, with the alkali in a soluble condition, whereas when the acetate of lime is employed it is wholly decomposed by aging and steaming, leaving the oxide of lime, which is but sparingly soluble, and the result is a dull color, greatly inferior in brightness to that obtained by my invention.

I claim as my invention and desire to secure by Letters Patent—

The process hereinbefore described of producing printed color upon a textile material by printing it with the coloring-material, applying to the textile material a compound of an alkali and acid that is partially decomposable by aging and steaming, and steaming said textile material, substantially as before described.

ALFRED PARAF.

Witnesses:
W. L. BENNEM,
E. S. RENWICK.